(12) United States Patent
DeLapa et al.

(10) Patent No.: US 10,666,448 B2
(45) Date of Patent: May 26, 2020

(54) RESPONSIVE COMMUNICATION SYSTEM

(71) Applicant: Vocal Power-House Systems, LLC, Grand Rapids, MI (US)

(72) Inventors: James P. DeLapa, Grand Rapids, MI (US); Samuel-Hunter Berndt, Belding, MI (US); Can Gokcek, Belleville, MI (US)

(73) Assignee: Vocal Power-House Systems, LLC, Grand Rapids, MI (US)

( * ) Notice: Subject to any disclaimer, the term of this patent is extended or adjusted under 35 U.S.C. 154(b) by 0 days.

(21) Appl. No.: 15/765,940

(22) PCT Filed: May 11, 2017

(86) PCT No.: PCT/IB2017/052779
§ 371 (c)(1),
(2) Date: Apr. 4, 2018

(87) PCT Pub. No.: WO2018/011639
PCT Pub. Date: Jan. 18, 2018

(65) Prior Publication Data
US 2018/0287809 A1 Oct. 4, 2018

Related U.S. Application Data

(60) Provisional application No. 62/379,528, filed on Aug. 25, 2016, provisional application No. 62/361,728, filed on Jul. 13, 2016.

(51) Int. Cl.
*H04L 29/08* (2006.01)
*H04L 12/18* (2006.01)
*H04M 3/56* (2006.01)

(52) U.S. Cl.
CPC ........ *H04L 12/1822* (2013.01); *H04M 3/562* (2013.01); *H04M 3/568* (2013.01)

(58) Field of Classification Search
None
See application file for complete search history.

(56) References Cited

U.S. PATENT DOCUMENTS 4,941,187 A 7/1990 Slater
6,539,084 B1 3/2003 Long
(Continued)

FOREIGN PATENT DOCUMENTS

WO WO 2015/158266 A1 10/2015

OTHER PUBLICATIONS

International Search Report of the International Searching Authority from corresponding Patent Cooperation Treaty (PCT) Application No. PCT/IB17/52779, indicated completed on Jul. 23, 2017.
(Continued)

*Primary Examiner* — Natisha D Cox
(74) *Attorney, Agent, or Firm* — Gardner, Linn, Burkhart & Ondersama LLP

(57) ABSTRACT

A spoken communication system includes a plurality of domestic devices and a server. Each of the devices is responsive to spoken communication to communicate that spoken communication to other devices, and to receive spoken communications received by other communication devices. The server is in digital communication with domestic devices to communicate that spoken communication among the registered devices.

12 Claims, 10 Drawing Sheets

(56) References Cited

U.S. PATENT DOCUMENTS

| | | | |
|---|---|---|---|
| 7,013,000 B2 | 3/2006 | Bortolini et al. | |
| 7,065,196 B2 | 6/2006 | Lee | |
| 7,075,918 B1 | 7/2006 | Kung et al. | |
| 7,085,361 B2 | 8/2006 | Thomas | |
| 7,683,924 B2 | 3/2010 | Oh et al. | |
| 9,049,306 B1 | 6/2015 | Gueorguieva et al. | |
| 9,113,052 B1 | 8/2015 | Scalisi et al. | |
| 9,270,931 B2 | 2/2016 | Frankel et al. | |
| 2003/0207694 A1* | 11/2003 | Legare | H04M 1/72513 455/511 |
| 2004/0135686 A1 | 7/2004 | Parker | |
| 2007/0019571 A1* | 1/2007 | Stogel | H04L 69/18 370/260 |
| 2009/0022131 A1* | 1/2009 | Rusanen | B66B 1/468 370/338 |
| 2009/0310762 A1* | 12/2009 | Velius | H04M 3/42204 379/93.01 |
| 2010/0263047 A1 | 10/2010 | Denninghoff et al. | |
| 2010/0299385 A1* | 11/2010 | Root | H04M 3/42365 709/202 |
| 2011/0275348 A1* | 11/2011 | Clark | H04L 63/0861 455/411 |
| 2013/0201316 A1* | 8/2013 | Binder | H04L 67/12 348/77 |
| 2015/0077240 A1 | 3/2015 | Eck | |
| 2015/0179057 A1 | 6/2015 | Morimoto et al. | |
| 2015/0287026 A1* | 10/2015 | Yang | G06Q 20/3678 705/69 |
| 2015/0304416 A1* | 10/2015 | Higashi | H04L 67/1095 709/217 |
| 2015/0334336 A1* | 11/2015 | Chiu | H04N 5/4403 348/383 |
| 2016/0118036 A1* | 4/2016 | Cheatham | G10K 11/178 380/252 |
| 2016/0155310 A1* | 6/2016 | Joao | G08B 21/0269 340/573.1 |
| 2016/0191452 A1* | 6/2016 | Collins | G06F 3/04842 709/206 |
| 2016/0232429 A1 | 8/2016 | Park et al. | |
| 2016/0292408 A1* | 10/2016 | Zhang | G06F 21/32 |

OTHER PUBLICATIONS

Written Opinion of the International Searching Authority from corresponding Patent Cooperation Treaty (PCT) Application No. PCT/IB17/52779, indicated completed on Jul. 23, 2017.

\* cited by examiner

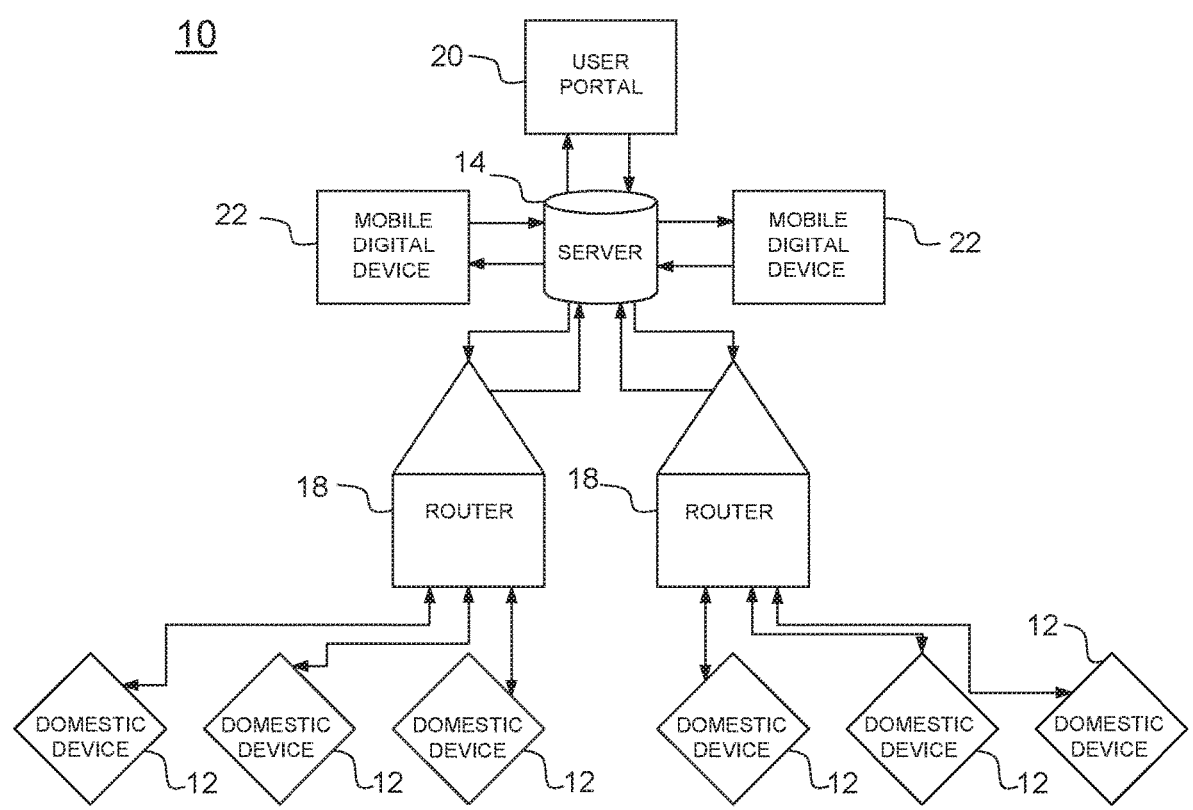

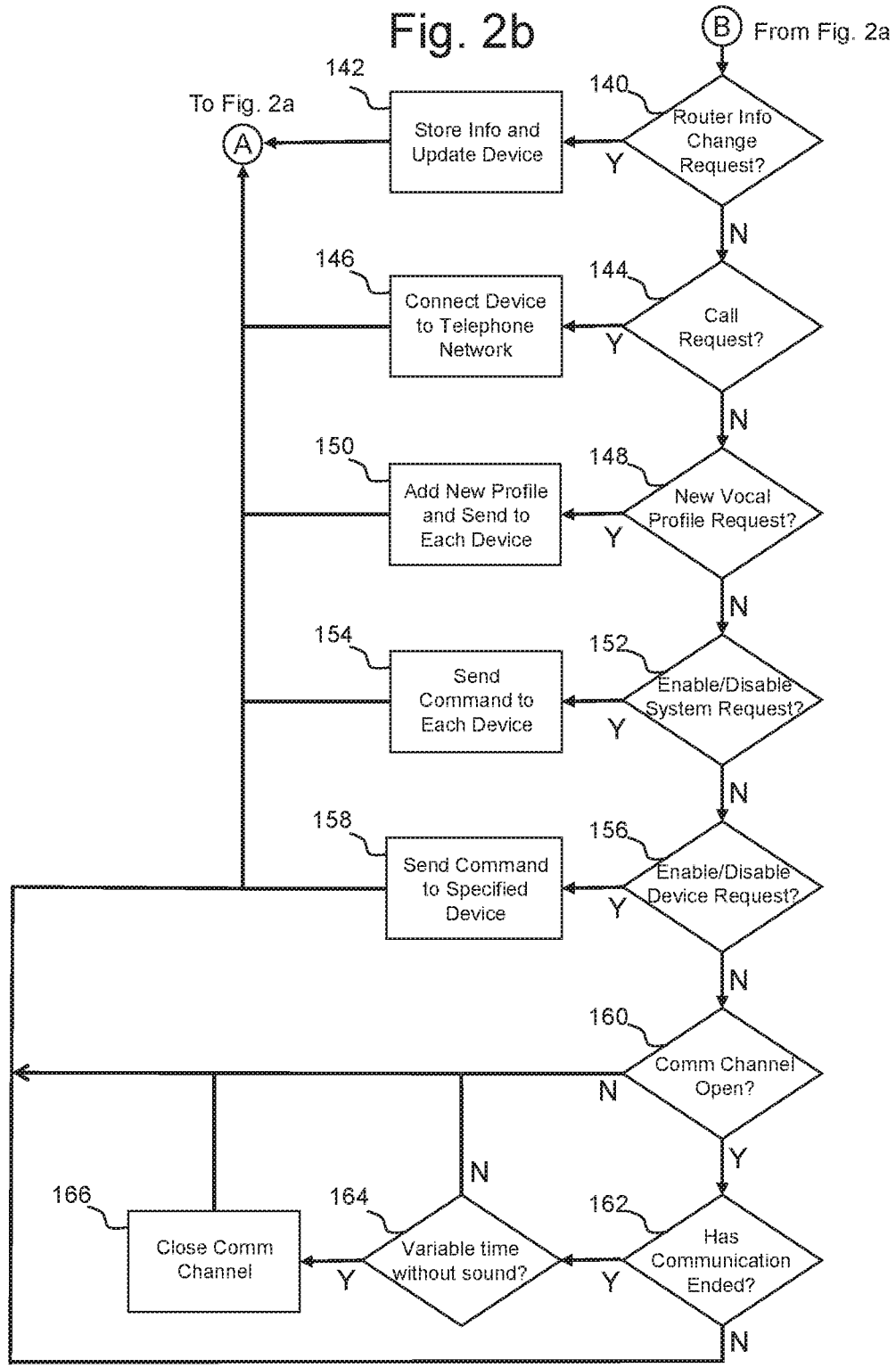

RESPONSIVE COMMUNICATION SYSTEM

CROSS-REFERENCES TO RELATED APPLICATIONS

This application claims benefit under U.S. Provisional Patent Application Ser. No. 62/361,728 filed Jul. 13, 2016, U.S. Patent Application Serial No. 62/379,528 filed Aug. 25, 2016 and Internal Application Number PCT/IB2017/052779 published as WO2018/011639 A1 which are incorporated herein by reference in their entirety.

BACKGROUND OF THE INVENTION

The present invention is directed to a communication system that is restricted to a community, such as a family or other unit, and, in particular, to a system that provides spoken, or oral, communication among family members. While the invention is capable of providing spoken communication within a residence, it is also capable of providing such communication among several residences and among several platforms for residents that are outside of the residence(s).

Currently, home communication systems are permanently installed wall-mounted fixtures, known as intercoms, which require the user to be located in front of the fixture, and press and hold a button while speaking into a microphone. The person to whom the communication is directed needs to be near a corresponding unit. Such units require hard-wired communication cable interconnecting the units, as well as a source of power.

Various web-enabled communication techniques are available. Some even pick-up casual conversations without the conscious knowledge of the users. Such techniques provide access to the communication by the service provider. The service provider is able, through permission given via the user agreement, to record conversations and to extract information about the users from the on-line communications sent to their computers to provide marketing pitches, and the like. Communications among family members are often very sensitive and most private, and recording of such communication is typically not desired.

SUMMARY OF THE INVENTION

The present invention provides spoken communication of a person in one portion of a residence to another person in another portion of the residence or in another commonly owned residence. Embodiments of the invention provide communication with a person in a remote location. While it is already possible to place a cell phone call to a remotely located person, there is presently a need for the calling person to place the call and the recipient to answer the call.

A spoken communication system, according to an aspect of the invention, includes a plurality of domestic devices and a server. Each of the devices are responsive to spoken communication, to communicate that spoken communication to other devices, and to receive spoken communications received by other communication devices. The server is in digital communication with the domestic devices to communicate the spoken communication among the domestic devices by storing the spoken communication received from the domestic devices, sending the spoken communication to all other domestic devices, and removing the spoken communication from storage.

At least two routers may be in digital communication with the server. At least one of the domestic devices is in digital communication with each router. In this manner, a domestic device in communication with one of the routers in a residence is in digital communication with a domestic device in digital communication with another of the routers in a different residence.

The system may also include at least one mobile device in digital communication with the server. The at least one digital device may be configured to send and receive spoken communication with other domestic devices and mobile devices through digital communication with the server. The server may be restricted to communicate with only devices that are registered with the server. The system or a domestic device may be placed into a responsive or non-responsive state via spoken communication or via a command received from the at least one mobile device.

Additionally, a domestic device may be unresponsive to spoken communication below a threshold volume. A domestic device may also be unresponsive to spoken communication above a threshold volume. Further, the server may close a communication channel between devices a variable amount of time after the server detects spoken communication has ended. Digital communication between the plurality of domestic devices, the mobile device(s), and the server may also be encrypted. The server may be a physical server. The server may also be a logical server defined from a cloud web service.

In another aspect of the invention, a spoken communication system includes at least one domestic device configured to be positioned within an occupied structure and each domestic device may be responsive to spoken communication and capable of sending and receiving spoken communication. The system may also include at least one mobile device connected to the Internet. The mobile device may include a mobile communication application that is configured to send and receive spoken communication. The system may also include a server in digital communication with the domestic devices and the mobile devices to communicate the spoken communication among the devices.

At least two routers may be in digital communication with the server. At least one of the domestic devices may be in digital communication with each router. In this manner, a domestic device in communication with one of the routers in a residence is in digital communication with a domestic device in digital communication with another of the routers in a different residence. Additionally, the system may further comprise a plurality of mobile devices and each of the mobile devices may send a voicemail to the server and the server may then send the voicemail to each other mobile device. Each mobile device that receives the voicemail may store the voicemail in the mobile device's local storage until a user deletes it. The server may completely remove the voicemail from server local storage after the server completes sending the voicemail to each mobile device.

The domestic device may include at least one microprocessor, at least one microphone, at least one speaker, and a wireless network card. The server may be restricted to communicate with only domestic devices and mobile devices that are registered with the server. The system or domestic devices may be placed into a responsive or non-responsive state via spoken communication or via a command received from the at least one mobile device. The domestic devices may not be responsive to spoken communication below a threshold volume. The domestic devices may also be unresponsive to spoken communication above a threshold volume.

The mobile communication application may require users to enter credentials before accessing the mobile communication application. The digital communication between the domestic devices and the server may be encrypted and digital communications between the mobile devices and the server may also be encrypted. The server may store spoken communications received from the mobile devices and send the stored spoken communication to all other mobile devices in digital communication with the server. The server may then remove the spoken communication from storage. The server may be a physical server. The server may also be a logical server defined from a cloud web service.

In another aspect of the invention, a spoken communication system may include at least one domestic device configured to be positioned within an occupied structure. Each domestic device may be responsive to spoken communication from only authenticated users and be capable of sending and receiving spoken communication. The system may also include a server in digital communication with the domestic devices to communicate the spoken communication among the devices. The user may be authenticated by submitting a vocal profile to the server. The vocal profile may be submitted to the server by supplying credentials to an application on a device in digital communication with the server and then supplying the vocal profile to the application.

In another aspect of the invention, a method of communicating between domestic and mobile devices may include receiving spoken communication at a first device configured to send and receive communication. The first device may be a domestic device configured to be positioned within an occupied structure or a mobile device. A mobile device may include a mobile communication application. The first device may send the spoken communication to a server. The server may send the spoken communication to a mobile device when the first device is the domestic device. The server may send the spoken communication to a domestic device when the first device is a mobile device.

The method may further include sending only spoken communication received from registered domestic devices and mobile devices. The method may also further include determining, at the first device, if the spoken communication includes a request for the first device to enter a responsive state or an unresponsive state. If it is determined that the spoken communication includes a request to enter an unresponsive state, the first device may enter the unresponsive state. If it is determined that the spoken communication includes a request to enter a responsive state, the first device may enter the responsive state. If it is determined that the spoken communication does not include a request to enter a responsive state or an unresponsive state, the first device may instead send the spoken communication to a server. The method may also further comprise entering the first device into an unresponsive state if the first device receives spoken communication above a threshold volume.

These and other objects, advantages, and features of this invention will become apparent upon review of the following specification in conjunction with the drawings.

BRIEF DESCRIPTION OF THE DRAWINGS

FIG. 1 is a block diagram of a spoken communication system, according to an embodiment of the invention;
FIG. 2b is a continuation of the flowchart found in FIG. 2a;
FIG. 5b is a continuation of the flowchart found in FIG. 5a;
FIG. 7b is a continuation of the flowchart found in FIG. 7a.

DESCRIPTION OF THE PREFERRED EMBODIMENT

Figure 2A:
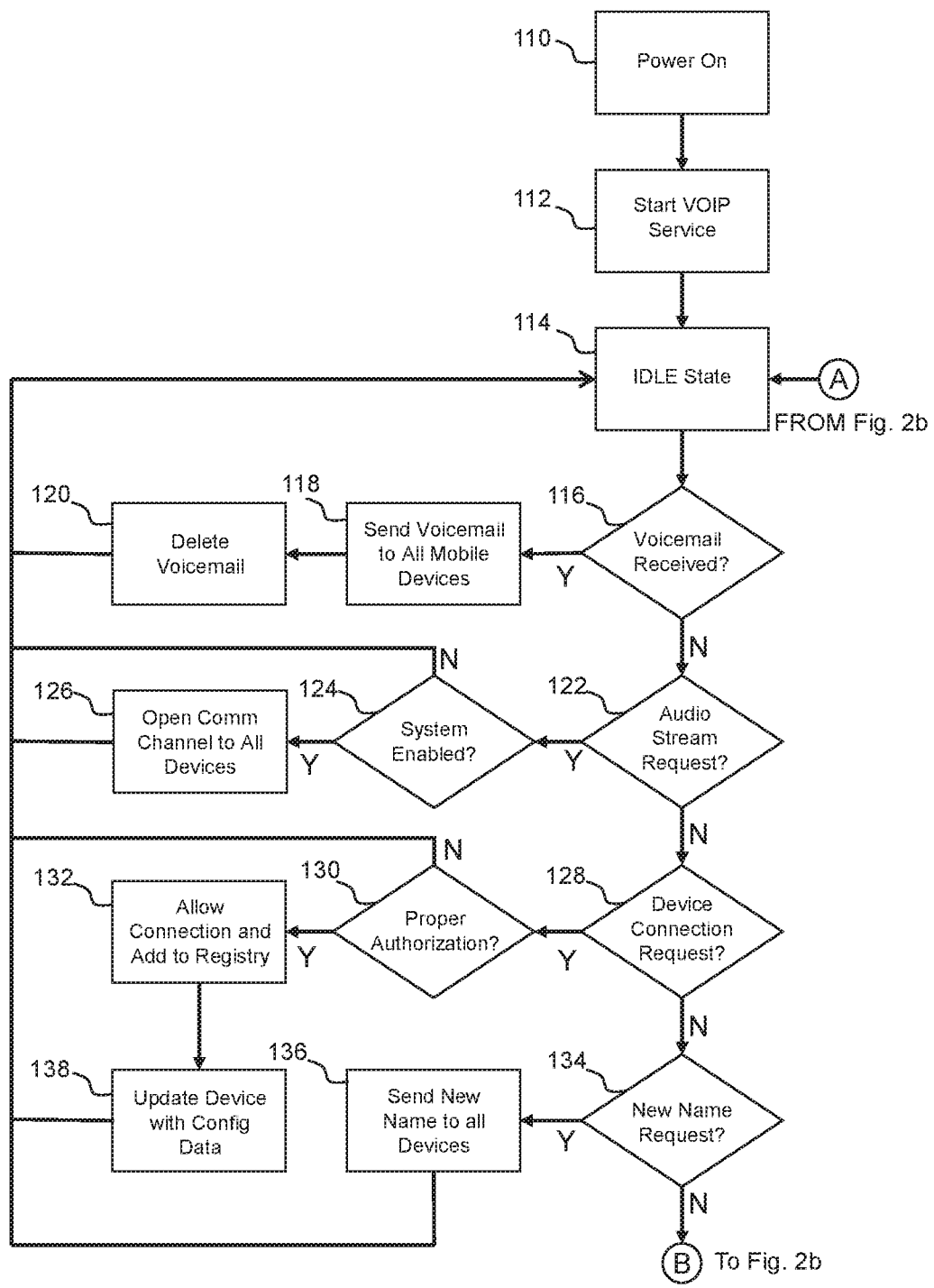
FIG. 2a is a flowchart of a server program.

Referring now to the drawings and the illustrative embodiments depicted therein, FIG. 1 depicts a spoken communication system 10 including at least one domestic device 12 and optionally at least one mobile device 22, each being responsive to spoken communication to communicate that spoken communication to other domestic devices 12 and mobile devices 22. The spoken communication system further includes a server 14 in digital communication with the domestic devices 12 and mobile devices 22. As will be described in more detail below, server 14 may be restricted to communicate with only registered devices that are registered with server 14. Domestic devices 12 may be activated by a variable or set command phrase and may only respond to authenticated users. In contrast to known voice-activated appliances that are web-enabled, communication system 10 ensures that spoken communications are discarded and never kept permanently on the server 14, and are only kept on devices when requested by the user (e.g., voice mail messages), which can be immediately and permanently deleted by the user. However, spoken communication system 10 still provides clear and near instantaneous communication among residents wherever located in one or more commonly shared residences or even outside the residences. For example, communication spoken within a reasonable distance of the domestic device 12 may be communicated. This may be accomplished by voice activation without the need to operate controls or otherwise require physical interaction with the system. However, system 10 has flexibility that allows domestic devices 12 to be temporarily muted if it is desired to limit the extent of the communication transmission.

Spoken communication system 10 may include a plurality of routers 18 in digital communication with server 14. One or more domestic devices 12 may be in digital communication with each of the routers 18. This use of routers facilitates, for example, domestic devices 12 in communication with one of the routers 18 in a residence, such as a primary residence being in digital communication with domestic devices 12 in communication with another of the router 18 in a different residence, such as a second residence. The term "digital communication" can be via wireless Wi-Fi, wired Ethernet, Bluetooth, 3G, 4G, LTE cellular networks, or other forms of digital communication known in the art. All such protocols are intended to be included in the term digital communication unless a particular protocol is specified. All digital communication in the spoken communication system, including digital communication to and from the server 14, domestic devices 12, and mobile devices 22 may be encrypted for further privacy and security. Server 14 may be a physical server of the type that may be physically located in a residence or may be a logical server defined from a cloud web service of the type known in the art. Server 14 is managed though a website or user management portal 20, which may be accessed through any number of means, such as through a browser, or an application on a mobile phone or tablet.

One or more mobile devices 22 may be in digital communication with server 14. Mobile devices 22 are devices that are web-enabled to communicate via a cellular network or other wireless network, such as a smart phone, tablet, or the like and include at least a speaker and a microphone. Mobile device 22 may receive spoken communication from one of domestic devices 12 via server 14 and transfer spoken communication to domestic devices or other mobile devices. This allows system 10 to communicate spoken communication to a user who is out of the residence without the need to place a call to that user or receive a call from that user. Thereby, seamless spoken communication can be provided hands-free from inside the residence to and from a community user not within range of a domestic device 12. A community user is a user that is a member of a family or other community and has permission to be a user of the system.

Turning to FIG. 2a, a server 14 facilities the transfer of spoken communication between each domestic device 12 and each mobile device 22. After the server 14 powers on at 110, the server 14 may start a Voice over IP (VOIP) service at 112. The server 14 then enters an idle state at 114, wherein the server 14 waits for spoken communication from a domestic device 14 or a mobile device 22. While in the idle state at 114, the server 14 will determine if it has received a voicemail at 116. If the server 14 has received a voicemail, the server 14 will send the voicemail at 118 to all mobile devices 22 connected to the server 14. After sending the voicemail, the server 14 will completely delete the voicemail at 120 from the server 14. This helps ensure the security and privacy of the spoken communications. The server 14 will then return to the idle state at 114.

If the server 14 determines it has not received a voicemail, the server 14 will next determine if it has received an audio stream request at 122. If the server 14 has received an audio stream request, the server 14 will next determine if the system is enabled at 124. If the system 10 is not enabled, the server 14 will return to the idle state at 114. If the system 10 is enabled, the server will open a communication channel at 126 to all devices connected to server 14. The server 14 will then return to the idle state at 114.

If the server 14 determines that it has not received an audio stream request, the server 14 will next determine if a device is requesting connection at 128 to server 14. If a domestic device or a mobile device is requesting connection, the server 14 will determine if the device provides proper authorization at 130. If the server 14 determines that the device did not provide proper authorization, the server 14 returns to the idle state at 114. If the device does provide proper authorization, the server 14 allows the connection and adds the device to the server registry at 132. The server 14 then sends configuration data to the device at 138. This configuration data comprises all the data the device requires to begin functioning. This data may include vocal profiles, system status, and other relevant information. The server 14 then returns to the idle state at 114.

If the server 14 determines that a device is not requesting a connection, the server 14 next determines if a new user name is being defined at 134. If a new user name is being defined, the server 14 adds the new user name to a database stored on the server and sends the new user name to all devices at 136 connected to the server 14. The server 14 then returns to the idle state at 114.

Turning now to FIG. 2b, if the server 14 determines that a new user name is not being defined, the server 14 determines if a mobile device 22 or user portal 20 is requesting to update router information at 140. This router information includes any information relevant to the server 14 or a device identifying or communicating with the router, such as IP address, MAC address, or the like. If a request to update router information is received, the server 14 will store the updated information and update all necessary devices at 142. The server will then return to idle at 114.

If the server 14 determines a router information request is not occurring, the server 14 determines if a device is attempting to make a call at 144. If a device is attempting to make a call, the server connects the requesting device to a telephone network at 146 in order to facilitate the call. The server 14 will maintain the connection between the device and the telephone network until the conclusion of the call. The server 14 then returns to the idle state 114.

If the server 14 determines that a device is not attempting to make a call, then the server 14 determines if a new vocal profile is being defined at 148. If it is determined that a new vocal profile is being defined, the server 14 adds the new vocal profile to a database stored on the server 14 and distributes the new vocal profile to each connected device at 150. The vocal profiles allow the system 10 to ensure that only authenticated users are able to access the system 10. When a user issues a spoken command, the device or the server 14 may verify that the user is an authenticated user by comparing the user's voice to the stored vocal profiles. The server 14 then returns to the idle state at 114.

If the server 14 determines that a new vocal profile is not being defined, the server 14 then determines if the system 10 is being enabled or disabled at 152. If the server 14 determines that the system 10 is being enabled or disabled, the server 14 sends the appropriate enable or disable command to each connected device at 154. The server 14 then returns to the idle state at 114.

If the server determines that the system 10 is not being enabled or disabled, then the server determines if a device is being enabled or disabled at 156. If the server 14 determines that a device is being enabled or disabled, the server 14 sends the appropriate enable or disable command to the specified device at 158. The server 14 then returns to the idle state at 114.

If the server determines that a device is not being enabled or disabled, the server 14 then determines if a request to open a communication channel has been received at 160. If the server 14 determines that an open communication channel request has not been received, the server returns to the idle state at 114. If the server 14 determines that an open communication channel request has been received, the server 14 then opens the communication channel and then determines if the spoken communication has ended at 162. The server typically accomplishes this by measuring the sound volume received against the typical ambient sound levels. If the server 14 detects spoken communication, then the conversation between users is still ongoing, and the server 14 returns to the idle state at 114. If the server 14 does not detect spoken communication, the server 14 then determines if a variable amount of time without spoken communication at 164. This variable time can be adjusted for the optimum time for the users of the system 10. If the server 14 determines that a variable amount of time has not passed, then the server 14 will return to the idle state at 114. If the server 14 determines that a variable amount of time has passed, the server 14 determines that the conversation between users has ended and closes the communication channel at 166. The server 14 then returns to the idle state at 114.

Figure 3:
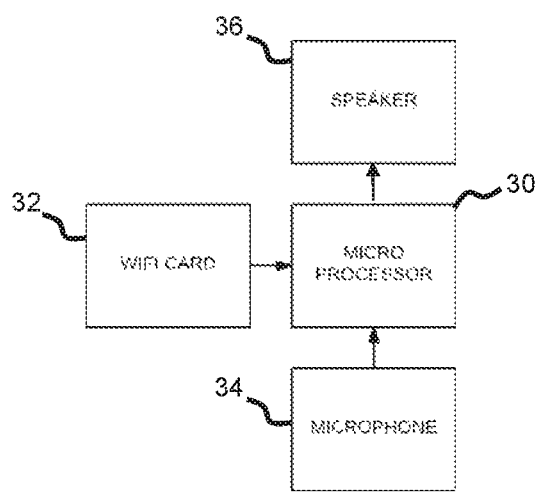
FIG. 3 is a block diagram of a domestic device.

Turning to FIG. 3, domestic devices 12 include a processor 30, such as a micro-processor, programmable gate array, or the like. Domestic devices 12 may include multiple processors for performance or other benefits. Domestic devices also include a Wi-Fi interface defined by a Wi-Fi card 32, at least one microphone input 34 to processor 30, and at least one speaker 36 annunciating audio output. The domestic device 12 may include multiple microphones or speakers for noise cancellation, stereo output, and the like. It is understood that this is a non-limiting example of a domestic device 12 components. Domestic devices 12 may utilize any number of other common computer processing components in order to facilitate sending and receiving spoken communication. Some examples could be RAM, nonvolatile storage, or other common communication and proceeding elements. Processor 30 executes a voice activation program that is responsive to audio input having a particular characteristic for communicating that audio input to at least one other of the devices. Any device with the suitable hardware (speaker, microphone, etc.) may be used as a domestic device and to execute the domestic device program. This includes many popular "smart speakers" on the market today, such as Amazon Echo and Google Home. The domestic device program is described in detail below and in FIGS. 4, 5a, and 5b. The program may be updated or transferred to the domestic device 12 in any number of ways. For example, a USB memory device may be provided to supply the program or other code to the processor 30, such as via a USB slot. The program may also be updated via the wireless connection. Domestic devices 12 are adapted to be positioned within a residence, such as attached to a wall, supported from a table, or the like.

Figure 4:
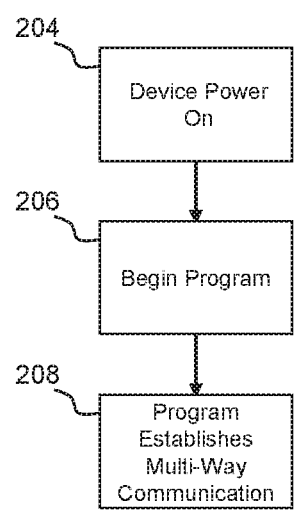
FIG. 4 is flowchart of a domestic device program.
Figure 5A:
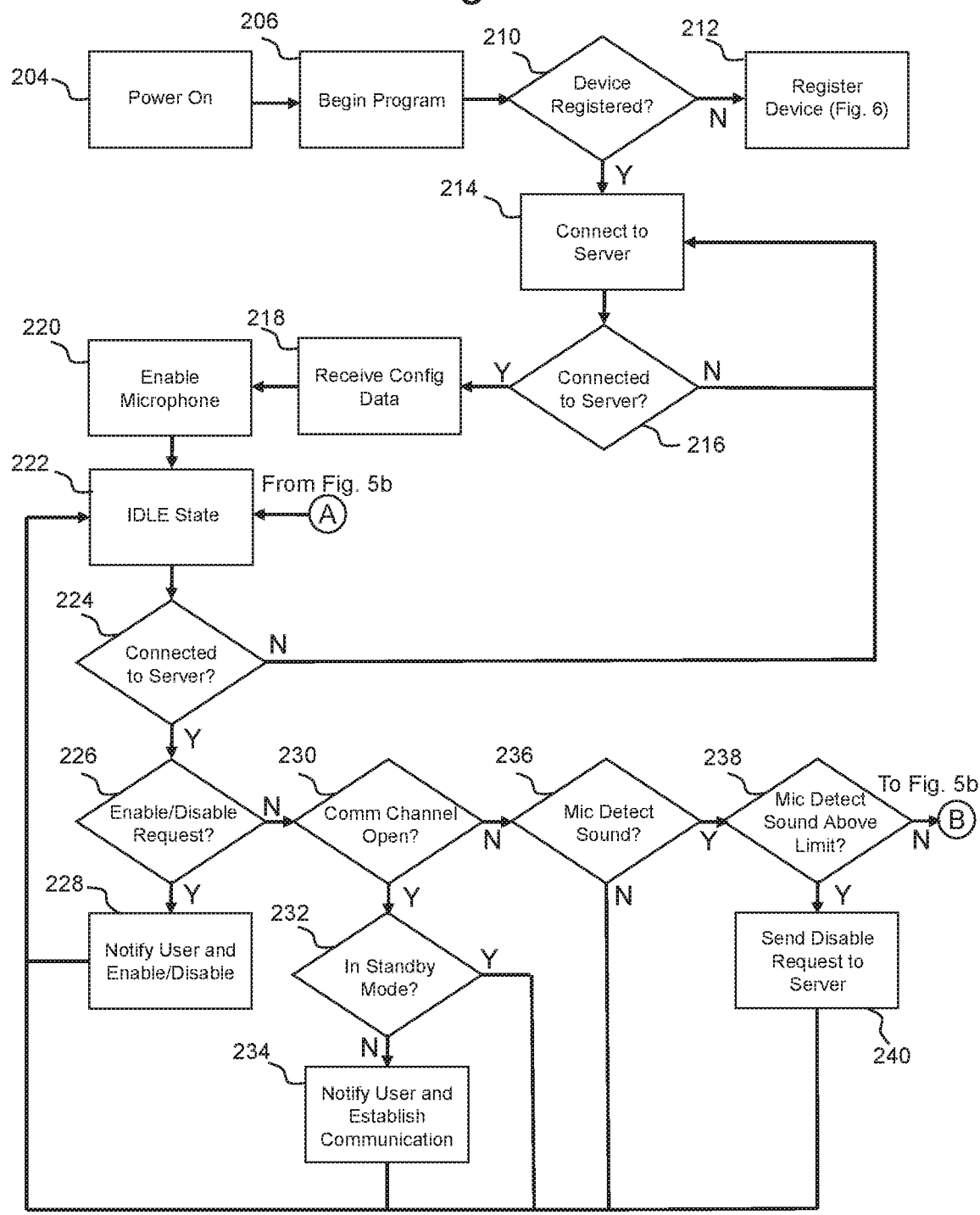
FIG. 5a is a more detailed flowchart of a domestic device program.
Figure 5B:
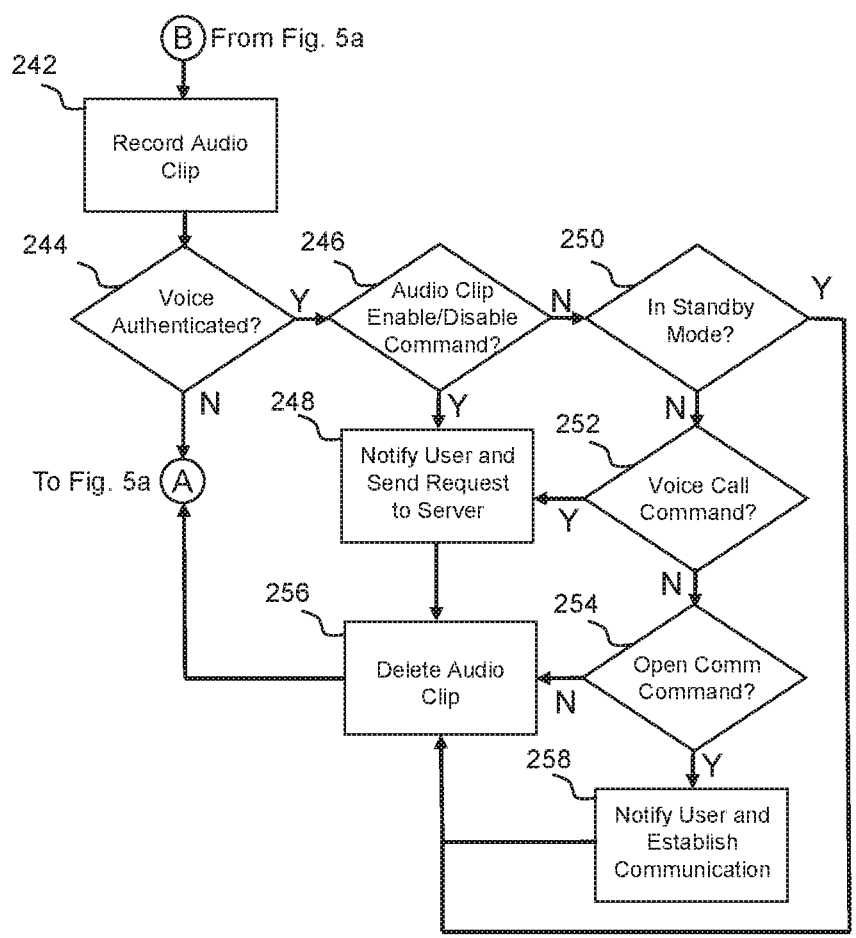

FIG. 4, FIG. 5a, and FIG. 5b depict flowcharts for a domestic device program executing on processor 30. After the domestic device 12 powers on at 204 and begins executing the program at 206, the domestic device program establishes multi-way communication between other devices at 208. This multi-way communication may, for example, be established through an application programming interface (API). Specifically in FIG. 5a, the domestic device program first determines if the domestic device 12 is registered at 210 to a router 18 and/or server 14. If the domestic device program is not registered, it proceeds to the registration phase at 212 (see FIG. 6). If the domestic device program is registered, the domestic device program next attempts connecting at 214 to server 14. The domestic device program verifies connection with the server 14 at 216. If it does not have connection, the domestic device program returns to attempting to connect at 214 to server 14. If the domestic device program does have connection to the server 14, the domestic device program next receives configuration data at 218 from the server 14. This configuration data comprises all the data the domestic device requires to begin functioning. This data may include vocal profiles, system status, and other relevant information. After receiving the configuration data, the domestic device program enables the microphone input(s) and enables the speaker(s) at 220.

Next, the domestic device program enters an idle state at 222. From the idle state, the domestic device program again determines if it is connected at 224 to the server 14. If it is not, the domestic device program returns attempting to connect at 214 to server 14. If the domestic device program is connected to the server 14, it next determines if it has received an enable or disable command at 226 from the server 14. The domestic device 12 receives commands from the user by the user speaking an activation word or phrase followed by a command. Both the activation phrase and the commands may be defined by the user. For example, the activation word may by "system" and the command may be "enable." The user could then provide a system enable command by speaking "system enable" within range of a domestic device 12. Any reasonable number of activation words and commands can be created and stored by the server 14. Additionally, the activation words and commands may be in any language. If the domestic device program has received an enable or disable command, the domestic device program provides an audio alert via the speaker 36 and appropriately enables or disables at 228. The domestic device program then returns to the idle state at 222. If domestic device program has not received such a command, it next determines if a communication channel has been opened at 230 by the server 14. If it has, domestic device 12 determines if it is a standby mode at 232. Standby mode is defined as a mode where the domestic device will only respond to an enable command. All other commands, such as ones to establish communication to other users, will be ignored. If the domestic device is in a standby mode, the domestic device disregards the open communication channel and returns to the idle state at 222. If the domestic device is not in a standby mode, the domestic device program provides an audio alert via the speaker 36, and sends and receives spoken communication to and from the server 14 via the microphone 34 and speaker 36 to establish communication at 234. The domestic device program then returns to the idle state at 222.

If the domestic device program determines a communication channel has not been opened, it next determines if the microphone is detecting sound at 236. If it is not, the domestic device program returns to the idle state at 222. Detecting sound includes determining if the detected sound is above a variable threshold. This variable threshold is provided in order adapt to the specific location and ambient sound level of each domestic device 12 and to specific user needs and desires. If it does detect sound, then the domestic device program next determines if the sound is above a variable cutoff threshold at 238. The variable cutoff threshold is provided in order to ensure that certain spoken communication is not analyzed or recorded. If the sound is above the variable cutoff threshold, the domestic device program requests that the server 14 disable the system at 240. Moving to FIG. 5b, if the sound is below the variable cutoff threshold, the domestic device program records the audio clip at 242. The domestic device program then determines if the audio clip is an authenticated voice at 244. This feature allows the system 10 to restrict the use of the system 10 to specific individuals. If the voice is not authenticated, the domestic device program deletes the audio clip and returns to the idle state at 222. If the audio clip is an authenticated voice, the domestic device program next determines if the audio clip is an enable or disable command at 246. This command can be directed toward a specific device or the system 10 as a whole. If the audio clip is an enable or disable command, the domestic device program provides an audio alert via the speaker 36, and sends the appropriate enable or disable request at 248 to the server 14. The domestic device program then deletes the audio clip at 256 and returns to the idle state at 222.

If the domestic device program determines that the audio clip is not an enable or disable command, it next determines if the domestic device 12 is in standby mode at 250. The device is placed into standby mode after it received a disable request from the user or the server 14. If the domestic device 12 is in standby mode, the domestic device program deletes the audio clip at 256 and returns to the idle state at 222. If the domestic device 12 is not in standby mode, the domestic device program determines if the audio clip is a voice call command at 252. If it is, the domestic device program provides an audio alert via the speaker 36 and sends the call request at 248 to the server 14. The domestic device program then deletes the recorded audio clip at 256 and returns to the idle state at 222. If the audio clip is not a voice call command, the domestic device program next determines if the audio clip is an open communication channel command at 254. If it is not, the domestic device program deletes the recorded audio clip at 256 and returns to the idle state at 222. If the audio clip is an open communication channel command, the domestic device program provides an audio alert via the speaker 36 and establishes and open communication channel with the server 14 at 258. At the conclusion of the communication, the domestic device program then deletes the recorded audio clip at 256 and returns to the idle state at 222.

Figure 6:
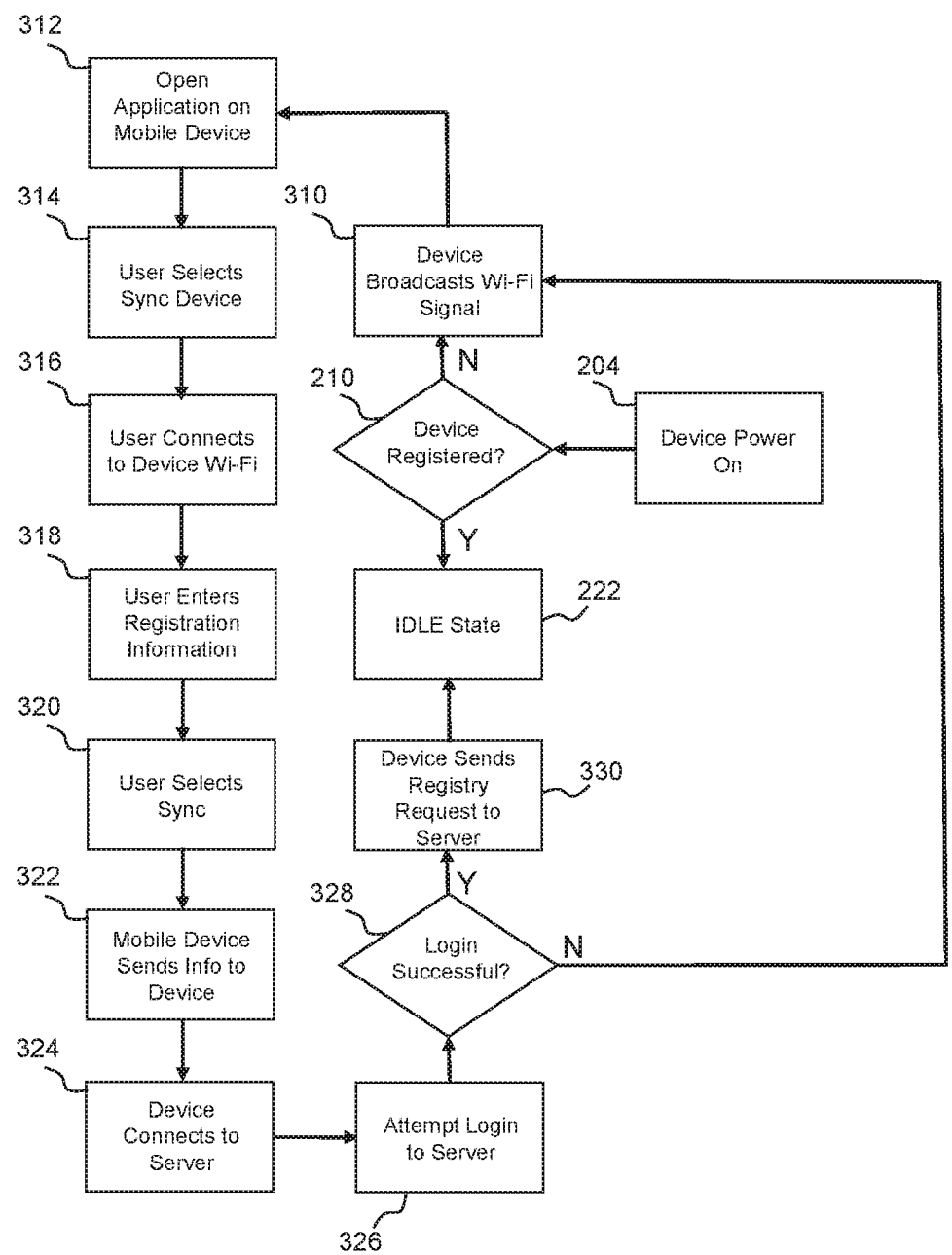
FIG. 6 is a flowchart of a device registration program.

As mentioned previously, the server 14 may restrict communications to only registered devices. Turning now to FIG. 6, after the device powers on at 204, when the domestic device program determines that the device is not registered at 210, the domestic device program broadcasts a Wi-Fi signal at 310. Next, a user opens a registration application at 312 on a mobile device, such as a phone or a tablet. This mobile device may or may not be a mobile device 22 in digital communication with the server 14. The user then selects a sync device option at 314 offered by the registration application. The user then connects the mobile device to the Wi-Fi broadcast by the domestic device 12 at 316, establishing direct digital communication between the mobile device and the domestic device 12. Next, the user enters registration information into the registration application at 318. Registration information can include information such as usernames, passwords, account information, router information, or anything else relevant to authenticating the user and/or domestic device 12. After entering the information, the user selects to sync the domestic device 12 at 320. This allows the mobile device to transmit the registration information at 322 to the domestic device 12.

Then, the domestic device 12 ceases broadcasting its Wi-Fi signal, and instead attempts to connect at 324 to the server 14. This connection may be achieved through a router 18 or any other device that provides digital communication with the server 14. This connection process may require any sort of authentication or credentials inherent in such a connection. For example, the device may need to provide a password to access the wireless network broadcast by a router 18. Either immediately before or immediately after the connection is established, the domestic device program transmits the registration information to the server 14, in order to login at 326. The domestic device program then determines if the login was successful at 328. If the login was not successful, the domestic device program returns to broadcasting a Wi-Fi signal at 310. If the login was successful, the domestic device program sends a registry request at 330 to the server 14, so that the server 14 may store the domestic device's 12 registration information to facilitate future connections. Next, the domestic device program enters the idle state at 222.

Figure 7A:
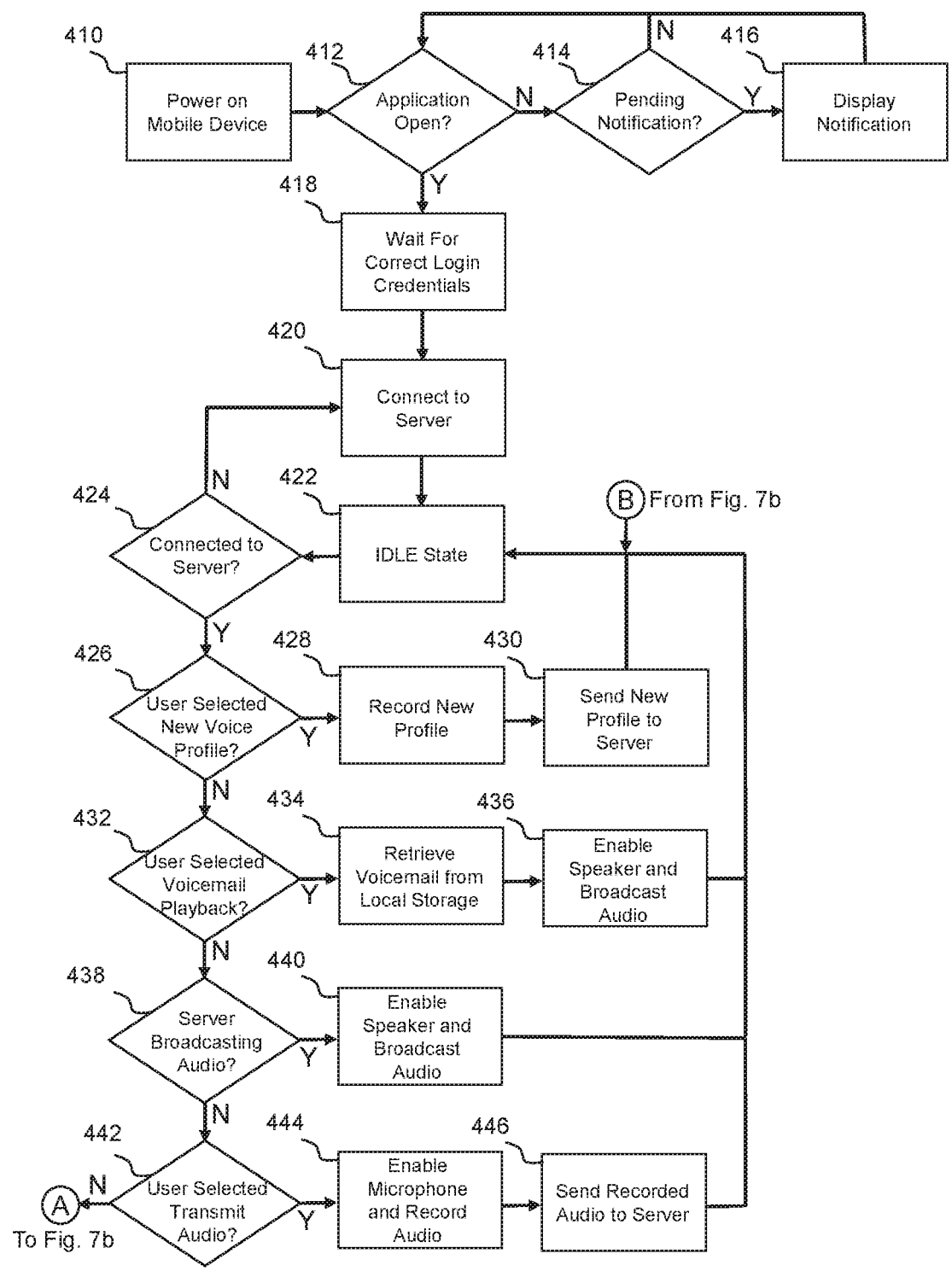
FIG. 7a is a flowchart of a mobile device program.

A mobile communication application is run on a smart phone, tablet, or other mobile device 22 that is connected to the Internet through a Wi-Fi or cellular data service, such as 3G, 4G, LTE, or the like. As shown in FIG. 7a, after a mobile device 22 powers on at 410, the mobile communication application determines if the user has opened the application at 412. If the user has not opened the application, the mobile communication application determines if there is a pending notification at 414. Such a notification indicates that the user has a voicemail or other message awaiting playback. If there is such a notification, the mobile communication application displays the notification to the user. If there is no notification, the mobile communication application returns to determining if the application is open at 412. If it determined that the mobile communication application is open, it then waits of the user to enter proper login credentials at 418. Login credentials typically include a username and password, but other authentication may be used, such as biometric authentication. After entering the proper login credentials, the mobile communication application attempts to connect at 420 to the server 14. The mobile communication application will continue to attempt until a connection is established. The mobile communication application then enters an idle state at 422. The mobile communication application then determines if it is still connected at 424 to the server 14. If not, the mobile communication application returns to attempting to connect at 420 to the server 14. If the connection remains, the mobile communication application determines if a new vocal profile is being defined at 426. If a new vocal profile is being defined, the mobile communication application records the new vocal profile at 428. This is typically accomplished by the mobile communication application prompting specific phrases of spoken communication from the user and recording the results. After recording, the mobile communication application sends the new vocal profile at 430 to the server 14. The mobile communication application then returns to the idle state at 422.

If the mobile communication application determines that a new vocal profile is not being created, it next determines if the user selected voicemail playback at 432. If so, the mobile communication application retrieves the selected voicemail from local storage at 434, and plays the selected voicemail at 436 for the user. The mobile communication application then returns to the idle state at 422.

If a user has not selected a voicemail, the mobile communication application then determines if the server 14 is broadcasting spoken communication at 438. If it is, the mobile communication application then enables the mobile device's 22 speaker at 440 and audibly broadcasts the received spoken communication received from the server 14. The mobile communication application then returns to the idle state at 422.

If the mobile communication application determines that the server 14 is not sending spoken communication, then it determines if the user selected to transit audio communication at 442. It is understood that the mobile communication application could recognize the user's intent in any number of ways. For example, the mobile communication application could provide a button labeled "speak." A button could be a physical button or on a touchscreen device. Additionally, the mobile communication application could be responsive to a spoken command. If the mobile communication application determines the user does wish to send audio communication, it then enables the mobile device's 22 microphone at 444 and records the audio. It then sends the spoken communication to the server 14 at 446. The server 14 is then responsible for broadcasting the audio communication to the proper device(s) (FIGS. 2a and 2b). The mobile communication application then returns to the idle state at 422.

Figure 7B:
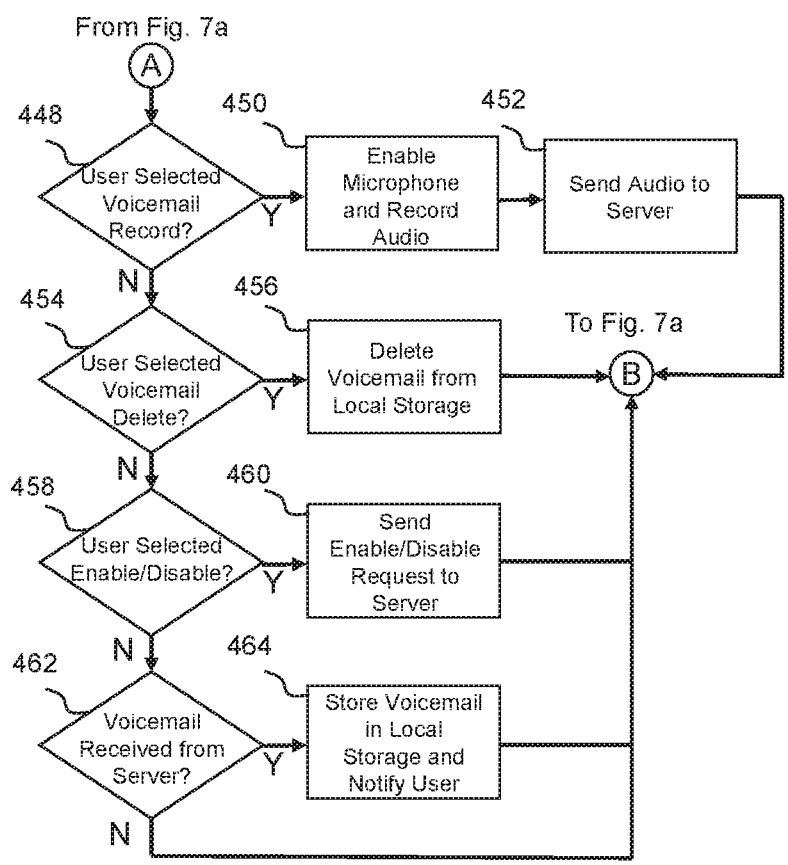

Turning to FIG. 7b, if the user is not attempting to send spoken communication, the mobile communication application determines if the user wishes to send a voicemail at 448.

A voicemail is defined as spoken communication recorded and stored as an audio file that can be played at a later time. Similarly to sending spoken communication, the mobile communication application can recognize the user's intent in any number of ways, such as a button or voice command. If the user does wish to send a voicemail, the mobile communication application enables the digital mobile device's 22 microphone and records the audio at 450, and sends the voicemail at 452 to the server 14. The server 14 will then proceeds to send the voicemail to all other mobile devices 22 connected to the server 14. The mobile communication application then returns to the idle state at 422.

If the user is not attempting to send a voicemail, the mobile communication application determines if the user wishes to delete a voicemail at 454. Similarly to sending spoken communication, the mobile communication application can recognize the user's intent in any number of ways such as a button or voice command. If the user does wish to delete a voicemail, the mobile communication application removes the voicemail from local storage at 456. The mobile communication application then returns to the idle state at 422.

If the user is not attempting to delete a voicemail, the mobile communication application determines if the user wishes to enable or disable at 458 a domestic device 12 or the system 10. Similarly to sending spoken communication, the mobile communication application can recognize the user's intent in any number of ways, such as a button or voice command. If the user does wish to enable or disable a domestic device 12 or the system 10, the mobile communication application sends the appropriate enable or disable command at 460 to the server 14. The mobile communication application then returns to the idle state at 422.

If the user is not attempting to enable or disable a domestic device 12 or the system 10, the mobile communication application determines if the digital mobile device 22 has received a voicemail at 462 from the server 14. If it has not, the mobile communication application returns to the idle state 422. If the digital mobile device 22 has received a voicemail from the server 14, the voicemail is stored in local storage and a notification is sent to the user at 464. The notification can take many forms, such as displaying a message on the screen, sending a text message or an email, or other various means of notification. Then, the mobile communication application returns to the idle state at 422.

Thus, it is seen that embodiments of the invention provide a spoken communication system that is both versatile and unrestricted geographically, yet maintains all communication by the users of the system isolated from capture by systems on the Internet, and helps ensure privacy and security. Such Internet systems tend to build databases of users habits and characteristics in order to market to the users and even potentially worse. By isolating the system from the interception by others on the Internet, the system provides privacy with exceptional functionality and versatility.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A spoken communication system, comprising:
    a plurality of domestic devices, each configured to be positioned within an occupied structure and being responsive to spoken communication to communicate that spoken communication to other devices and to receive spoken communications received by other of said domestic devices; and
    an internet connected server that is selectively in digital communication with said domestic devices and adapted to receive a spoken audio stream request, said server responsive to receiving an audio stream request by opening communication channels with said domestic devices that are connected with said server;
    wherein the server is adapted to receive spoken communication captured by one of said domestic device that is in communication with said server, wherein the server is adapted to store the spoken communication received from the one of said domestic devices and send the stored spoken communication to all other domestic devices in digital communication with the server over the open communication channels with the other domestic devices, wherein communication channels are open among said domestic devices that are connected with said server to communicate spoken communication among domestic devices that are connected with said server; and
    wherein the server is adapted to remove the spoken communication from storage after the spoken communication is sent to the speakers of all other domestic devices in digital communication with the server and the domestic devices are adapted to only keep spoken communication when requested by the user, wherein spoken communication is not kept permanently on the server or the domestic devices wherein spoken communications by the users of the system are isolated from capture by systems on the Internet to thereby ensure privacy and security.

2. The spoken communication system as claimed in claim 1, including at least two routers in digital communication with the server and at least one domestic device in digital communication with each router, wherein a domestic device in digital communication with one of the routers in a residence is in digital communication with a domestic device in digital communication with another of the routers in a different residence.

3. The spoken communication system as claimed in claim 1 including at least one mobile device in digital communication with the server.

4. The spoken communication system as claimed in claim 3, wherein the at least one mobile device is configured to send and receive spoken communication with other domestic devices and mobile devices through digital communication with the server.

5. The spoken communication system as claimed in claim 4, wherein the server is restricted to communicate with only domestic devices and mobile devices that are registered with the server.

6. The spoken communication system as claimed in claim 3, wherein the spoken communication system, or at least one domestic device, may be placed into a responsive or non-responsive state via spoken communication or via a command received from the at least one mobile device.

7. The spoken communication system as claimed in claim 5, wherein the domestic device is not responsive to spoken communication below a threshold volume.

8. The spoken communication system as claimed in claim 7, wherein the domestic device is unresponsive to spoken communication above a threshold volume.

9. The spoken communication system as claimed in claim 3, wherein the server closes a communication channel between devices a variable amount of time after the server detects spoken communication has ended.

10. The spoken communication system as claimed in claim 3 wherein digital communication between the plurality of domestic devices, the at least one mobile device, and the server is encrypted.

11. The spoken communication system as claimed in claim 3, wherein the server is a physical server.

12. The spoken communication system as claimed in claim 3, wherein the server is a logical server defined from a cloud web service.

* * * * *